UNITED STATES PATENT OFFICE.

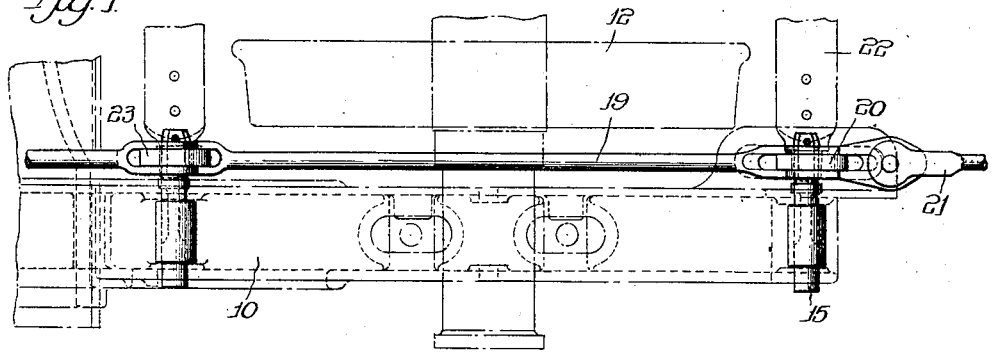
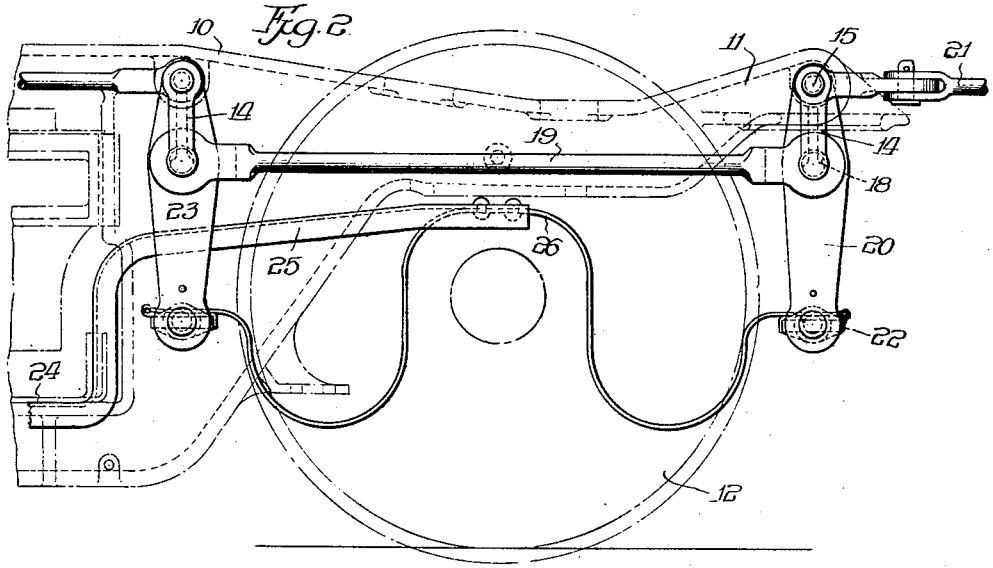
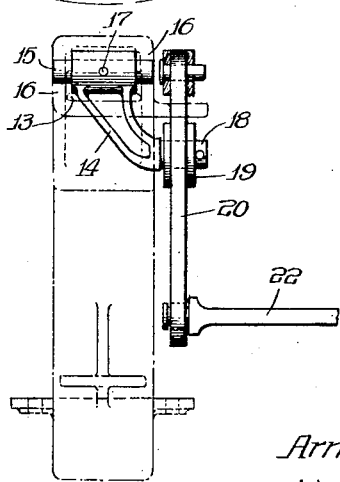

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

1,325,535. Specification of Letters Patent. Patented Dec. 23, 1919.

Application filed August 26, 1918. Serial No. 251,354.

*To all whom it may concern:*

Be it known that I, ARMAND H. PEYCKE, a citizen of the United States, residing at Chicago, in the county of Cook and State of Illinois, have invented certain new and useful Improvements in Brake Mechanism, of which the following is a specification.

This invention relates to brake mechanism, and more particularly to means for supporting the brake rigging.

One of the objects of this invention is to improve the construction of the truck side frame to facilitate supporting the brake rigging.

Another object is to improve the brake suspension mechanism in a manner to meet the various requirements for successful commercial operation.

These and other objects are accomplished by means of the arrangement disclosed on the accompanying sheet of drawings, in which—

Figure 1 is a fragmentary plan view of a railway car truck embodying my invention;

Fig. 2 is a fragmentary side elevation of the same; and,

Fig. 3 is a fragmentary end elevation of the same arrangement, parts being in section.

The various novel features of my invention will be apparent from the following description and drawings and will be particularly pointed out in the appended claims.

Referring to the figures of the drawings, it will be noted that I have shown a truck including a truck side frame 10, the opposite ends 11 of which are formed integrally with the main body portion of the side frame and which extend beyond the journal boxes or axles of the wheels, and, as a matter of fact, beyond the outer extremity of the associated truck wheels 12.

The truck side frame is extended in the manner described for the purpose of supporting the associated brake rigging. Although I have shown only a portion of the frame wherein the extended part thereof is associated with the live lever end of the truck, it will be understood that the dead lever end is extended in the same manner. This truck side frame 10 is provided with a channel portion 13, the open end of the channel facing downwardly. The channel portion in the extended end of the truck frame receives a brake hanger 14 provided with a transversely extending opening for the reception of a rounded pin 15 journaled in the side flanges 16 of the channel portion, the brake hanger 14 preferably being keyed to the pin 15 by a cotter 17, or any other suitable securing means. The brake hanger 14 is in the form of an elbow, the lower portion of which extends laterally with respect to the truck side frame and is provided with a rounded portion 18 which forms the pivotal connection between a pull rod 19 and a brake lever 20, the pull rod 19 at this point having oppositely arranged jaws between which the lever 20 is received. The upper end of the brake lever 20 is operatively connected to a pull rod 21 and the lower end of the brake lever is connected to a brake beam 22 carrying brake heads (not shown) for coöperation with the association truck wheels 12. The brake lever 23 at the opposite side of the associated truck wheel 12 is supported by another hanger 14, the arrangement being identical with the one described hereinabove. It will be understood also that the opposite side of the truck is provided with a duplicate arrangement whereby the mechanism is supported.

This arrangement does away with the ordinary brake hanger and permits absolute freedom of movement of the rigging lengthwise of the truck and assists materially in maintaining the rigging in proper alinement crosswise of the truck. It also provides sufficient clearance between the wheels and side frame even with the pull rods located in such space.

Connected to the spring plank 24 is a longitudinally extending bracket 25, to the end of which is connected a combined leveling and release spring 26, the opposite ends of which engage the brake beams on opposite sides of the wheel for performing the double function mentioned.

There may be various modifications of the invention herein particularly shown and described, and it is my intention to cover all such modifications which do not involve a departure from the spirit and scope of the following claims.

I claim:

1. In a railway car truck, a truck side frame having a channel portion, and a hanger mounted in said channel portion and having a laterally extending portion for supporting the brake rigging and forming a pivotal connection between two brake rigging parts.

2. In brake mechanism, a support, a pull rod, a brake lever, and a hanger connected to said support and having a laterally extending portion forming a connection between the pull rod and lever.

3. In a railway car truck, a truck side frame having a channel portion, a pull rod at one side thereof, a brake lever, and a movably mounted hanger supported in the channel portion of said side frame and having a laterally extending portion forming a pivotal connection between said pull rod and lever.

Signed at Chicago, Illinois, this 19th day of August, 1918.

ARMAND H. PEYCKE.